(12) United States Patent
Elmufdi

(10) Patent No.: US 10,534,625 B1
(45) Date of Patent: Jan. 14, 2020

(54) CARRY CHAIN LOGIC IN PROCESSOR BASED EMULATION SYSTEM

(71) Applicant: CADENCE DESIGN SYSTEMS, INC., San Jose, CA (US)

(72) Inventor: Beshara Elmufdi, San Jose, CA (US)

(73) Assignee: Cadence Design Systems, Inc., San Jose, CA (US)

(*) Notice: Subject to any disclaimer, the term of this patent is extended or adjusted under 35 U.S.C. 154(b) by 523 days.

(21) Appl. No.: 15/064,418

(22) Filed: Mar. 8, 2016

(51) Int. Cl.
*G06F 9/455* (2018.01)

(52) U.S. Cl.
CPC .................................. *G06F 9/455* (2013.01)

(58) Field of Classification Search
None
See application file for complete search history.

(56) References Cited

U.S. PATENT DOCUMENTS

| 7,028,281 | B1* | 4/2006 | Agrawal | G06F 17/5054 326/41 |
| 2003/0105617 | A1* | 6/2003 | Cadambi | G06F 17/5022 703/14 |
| 2016/0327609 | A1* | 11/2016 | Larzul | G01R 31/31703 |

OTHER PUBLICATIONS

Hauser (Hauser, John R., and John Wawrzynek. "Garp: A MIPS processor with a reconfigurable coprocessor." Field-Programmable Custom Computing Machines, 1997. Proceedings., The 5th Annual IEEE Symposium on. IEEE, 1997.) (Year: 1997).*
Le (Le, Thuan, and Mohammed AS Khalid. "NoC prototyping on FPGAs: A case study using an image processing benchmark." Electro/Information Technology, 2009. eit'09. IEEE International Conference on. IEEE, 2009.) (Year: 2009).*

* cited by examiner

*Primary Examiner* — Bijan Mapar
(74) *Attorney, Agent, or Firm* — Eric L. Sophir; Dentons US LLP

(57) ABSTRACT

Disclosed herein is an apparatus and method for emulating hardware. The apparatus includes a data array configured to store input data for an emulation cycle and a carry chain coupled to the data array receives one or more inputs from the data array. The carry chain is configured to generate output data in response to performing an arithmetic operation by a set of configurable logic gates using the one or more inputs in a pre-determined number of clock cycles. One or more processors are coupled to the carry chain and the data array, and are configured to emulate a logic gate function using at least the input data from the data array or the output data from the carry chain.

20 Claims, 10 Drawing Sheets

CARRY CHAIN LOGIC IN PROCESSOR BASED EMULATION SYSTEM

TECHNICAL FIELD

This application relates generally to a processor based emulation system, and in particular relates to integration of a carry chain in a processor based emulation system.

BACKGROUND

Hardware emulators are programmable devices used in verification of hardware designs. Hardware emulators may include hardware components capable of processor-based (e.g., hardware-based) emulation of logic systems, such as application specific integrated circuits (ASICs), central processing units (CPUs), graphics processing units (GPUs), and the like. By executing various forms of programmable logic, the hardware emulators may be programmed to mimic the functionality of nearly any prototype logic system design, such as an integrated circuit, an entire board of integrated circuits, or an entire system that is undergoing testing. This ability of mimicking of functionality allows logic system designers to prototype their logic system design using processor-based emulation before actually manufacture the logic system, such as an ASIC product, and thereby potentially saving millions of dollars by avoiding design failures.

The processor-based emulators comprises a processor that functions as a Boolean processor. The processor can do computations of input functions of various widths. These processor-based emulators sequentially evaluate combinatorial logic levels, starting at the inputs and proceeding to the outputs. Each pass through the entire set of logic levels is known as a cycle, and the evaluation of each individual logic level is known as an emulation step. The programs executed by the processor in a processor-based emulator may include instructions containing a sequence of operations. The processor typically corresponds to an instruction memory that is read sequentially and provides instructions that are used to read bits out of a data array.

The processor is connected to the data array that is a special memory. The data array has multiple read ports and supplies input data to the processor via each read port. The processor evaluates the data supplied from the data array in accordance with an instruction word supplied from an instruction memory. The bits that are read from the data array are fed to a lookup table (LUT) that is controlled by the instruction, and the result of the LUT function is then stored back into the data array. The data array may also contain the results of previous LUT evaluations. The data array further stores inputs that come from outside the processor (e.g., from other processors of the hardware emulator), and therefore the LUT not only has access to all previous results, but also values from outside the processor.

Processor-based emulators described above typically have a 16-way multiplexer LUT that is used to evaluate any Boolean function of 4 inputs (LUT4). The architecture of the processor-based emulators is built such that the LUT4 can perform only one evaluation per clock cycle.

In some architectures, multiple processors may be combined to form a processor cluster. Typically, the processor cluster may contain 4 or 8 processors. Because of the clustering of 4 to 8 processors, the processor cluster is able to perform more than 1 LUT4 evaluation per clock cycle. With the processor cluster architecture presently available, a chain of 4 LUT4s may be achieved. This clustered architecture means that in one clock cycle, up to 4 LUT4 evaluations can be performed. Due to the time-multiplexed nature of the processors, inputs required to do a computation are quite slow to operate. Also, there are large number of multiplexers positioned ahead of a computation logic in the architecture. Due to the use of large number of multiplexers, the number of processors that can be chained together becomes limited. Since only a limited number of the processors can be chained together, logic implementation using the chained processors are limited. One type of logic that is difficult to implement using the existing architecture having the limited number of the processors is arithmetic operations, such as addition and subtraction. These and other arithmetic operations require long chains of processors that tend to be cascaded together due to the limits of how many processors can be chained together. As an example, in one clock cycle, a processor can perform an addition of two 2-bit values, and the processor may utilize multiple clock cycles to perform an addition of two 32-bit values.

Thus, there is a need in the art for a hardware emulator that is able to perform arithmetic operations, such as addition and subtraction, at a speed faster than presently available hardware emulators.

SUMMARY

Disclosed herein are systems and methods of a programmable emulation system to execute an emulation process in order to emulate a logic system, such as an application-specific integrated circuit (ASIC). The emulation system comprises a carry chain that is configured to perform specific operations, such as arithmetic operations on inputs provided by a data array. The carry chain may implement functions, such as AND and OR gates, in the carry circuit. The size of carry chain is chosen such that the carry chain is able to process the inputs received within a pre-determined number of clock cycles. In one implementation, the size of carry chain may be chosen such that the carry chain processes the inputs received within one clock cycle. In another implementation, the size of carry chain may be chosen such that the carry chain processes the inputs received in more than one clock cycle.

In one embodiment, an apparatus for emulating hardware comprises a data array comprising non-transitory machine-readable storage media configured to store input data for an emulation cycle. The apparatus may further include a carry chain in communication with the data array to receive one or more inputs from the data array, where the carry chain is configured to generate output data in response to performing an arithmetic operation by a set of configurable logic gates using the one or more inputs in a pre-determined number of clock cycles. The apparatus may further include one or more processors in communication with the carry chain and the data array configured to emulate a logic gate function using at least the input data from the data array or the output data from the carry chain.

In one embodiment, a processor-implemented method for processing of data in an emulation system may include receiving, by a carry chain of the emulation system, one or more inputs from a data array including non-transitory machine-readable storage media configured to store input data for an emulation cycle. The method may further include generating, by the carry chain, output data in response to performing an arithmetic operation by a set of configurable logic gates using the one or more inputs in a pre-determined number of clock cycles. The method may further include emulating, by one or more processors coupled to the carry chain and the data array, a logic gate function using at least the input data from the data array or the output data from the carry chain.

In another embodiment, a processor-based hardware emulation circuit apparatus may include multiple hardware emulation chips. Each discrete hardware emulation chip may include multiple processors. The apparatus may further include a data array for storing output of the processors and input data for an emulation cycle. The apparatus may further include multiple instruction memories, each one connected to one processor for providing at least one instruction word to the corresponding processor. The apparatus may further include a carry chain having a set of configurable logic gates to perform an arithmetic operation by a set of configurable logic gates using the one or more inputs provided by the data array. The carry chain processes the inputs in a pre-determined number of clock cycles. The one or more processors are configured to emulate a logic gate function using at least the input data from the data array or the output data from the carry chain.

It is to be understood that both the foregoing general description and the following detailed description are exemplary and explanatory, and are intended to provide further explanation of the invention as claimed.

BRIEF DESCRIPTION OF THE DRAWINGS

The accompanying drawings constitute a part of this specification and illustrate an embodiment of the invention and together with the specification, explain the invention.

DETAILED DESCRIPTION

Figure 1A:
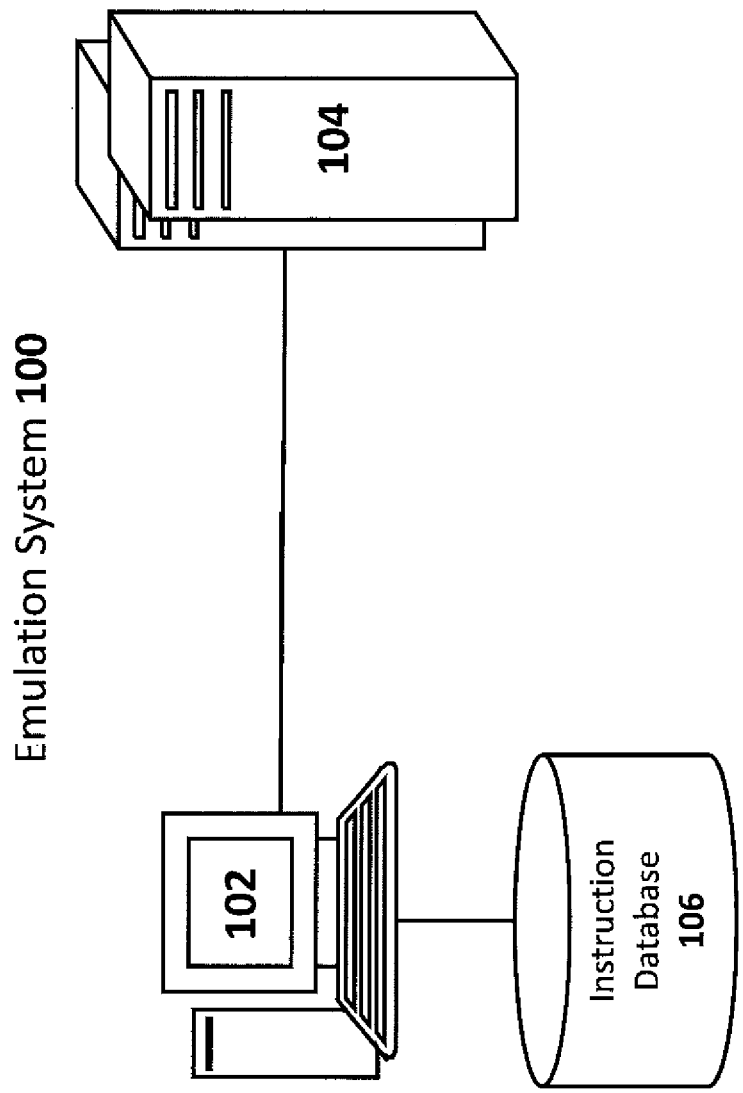
FIG. 1A is a schematic diagram showing components of an emulation system, according to an exemplary embodiment.

The present disclosure is here described in detail with reference to embodiments illustrated in the drawings, which form a part here. Other embodiments may be used and/or other changes may be made without departing from the spirit or scope of the present disclosure. The illustrative embodiments described in the detailed description are not meant to be limiting of the subject matter presented here.

Reference will now be made to the exemplary embodiments illustrated in the drawings, and specific language will be used here to describe the same. It will nevertheless be understood that no limitation of the scope of the invention is thereby intended. Alterations and further modifications of the inventive features illustrated here, and additional applications of the principles of the inventions as illustrated here, which would occur to one skilled in the relevant art and having possession of this disclosure, are to be considered within the scope of the invention.

FIG. 1A is a schematic diagram showing components of an emulation system 100, according to an exemplary embodiment. The emulation system 100 includes a computer workstation 102, emulation devices 104, and an instruction database 106.

The computer workstation 102 provides emulation support facilities to the emulation devices 104. The computer workstation 102 may include at least one central processing unit (CPU), support circuits, and a memory. The CPU may include one or more microprocessors and/or microcontrollers. The support circuits may be circuits that are used to support the operation of the CPU. These circuits may include power supplies, clocks, input/output interface circuitry, cache and the like. The computer workstation 102 may further include a memory that may comprise random access memory, read only memory, removable disk memory, flash memory, optical storage and various combinations of these types of memory. The memory may be a main memory and may in part be used as cache memory or buffer memory. The memory stores various forms of software and files, such as an operating system and a compiler. The computer workstation 102 allows a user to interface with the emulation devices 104, control the emulation process and collect emulation results for analysis. Under control of the computer workstation 102, programming information and data is loaded to the emulation device 104.

The emulation devices 104 may be a collection of computing hardware capable of executing the emulation processes. The emulation devices 104 are composed of individual emulation circuits. Typically, the emulation circuits are integrated circuits (also referred to herein as emulation chips). The emulation devices 104 include racks housing emulation logic boards, emulation processors, and other computing hardware designed to emulate the designs of prototype application-specific integrated circuits (ASICs) and/or other logic systems. In some embodiments, the emulation devices 104 may include a server computer having separate processors, which may execute software modules configured to manage and control the resources and performance of the emulation system 100. Non-limiting examples of these software modules may include a compiler and a configuration manager stored in the memory. The emulation devices 104 may be composed of individual emulation circuits. Typically, the emulation circuits are integrated circuits (also referred to herein as emulation chips).

In response to the programming received from the emulation support facilities, the emulation devices 104 emulates a portion of a target system (e.g., a circuit being emulated). The portion of the target system may be an integrated circuit, a memory, a processor, or any object or device that can be emulated in a programming language. The emulation programming languages include Verilog and VHDL.

A compiler may be a software module, which may be executed by a computer workstation 102 or on an emulation device 104, and is configured to receive and compile a netlist design file as understood in the art, containing the logical gate design of an ASIC or other logic system. The compiler may then generate a virtual logic file based on the compiled netlist. In other words, the compiler maps the ASIC's (or other logic system's) logic into the hardware components of the emulation system 100 to generate instructions for the components of the system 100 components to function as the emulated ASIC or other logic system. The compiler module may comprise a partitioner and scheduler component or function, though it should be appreciated that the compiler may be segmented into any number of component software modules. In an opening import phase, the compiler receives the netlist and begins compiling. Here, the compiler may parse the logic gates of the netlist into a database format. A partitioner may determine which part of the netlist is going to be executed by which type of instance of hardware resource of the system 100. Then, a scheduler may determine for that part of the netlist which of the hardware resources should execute the part of the netlist and when in the execution cycle that logic component (e.g., gate, instruction) should be executed. The compiler may be capable of determining the status of components of the system 100, including the allocation status of particular components or whether the resource is inoperable (e.g., marked-out).

A configuration manager may be software module, which may be executed by a computer workstation 102 or a emulation device 104, and is configured to track the status and control the task performed of components of the system 100. The configuration manager may determine which components of the system 100 are available or unavailable to receive parts of the virtual logic generated by the compiler. In some cases, the configuration manager continuously polls or self-tests the emulation system 100 for faulty hardware components.

In some cases, these software modules may be executed in whole or in part on a computer workstation 102, such as an administrator or user computer, which may communicate data and instructions associated with the respective software module to and from the emulation device 104. For example, in some cases, the computer workstation 102 may execute a compiler module that allows a user to input a netlist design file, containing logic gate designs of the prototype ASIC or other prototype logic system, and then compiles the netlist file. The resulting virtual logic may then be transmitted or downloaded to an emulation device 104, and may execute a configuration manager module configured to track the availability of resources within the emulation system 100. It should be appreciated that the computer workstation 102 may be any computing device comprising a processor and non-transitory machine-readable storage that render the host device 104 capable of performing the various tasks and processes described herein. Non-limiting examples of host devices 104 may include workstation computers, laptops, tablets, server computers, and the like.

An instruction database 106 may store records of virtual logic or instruction sets compiled by the compiler from netlist files. The instruction database 106 may be hosted in non-transitory machine-readable storage medium of any computing device capable of hosting the instruction database 106 and performing the various tasks and processes associated with the instruction database 106, as described herein. The instruction database 106 may receive, from a device executing the compiler instructions compiled from the netlist file of an ASIC or other logic system. In some cases, the instructions may be contained within a virtual logic file generated by the compiler. At download time, when the emulation system's 100 hardware components are loaded with the instructions, the instruction database 106 may transmit or otherwise provide the instructions to the components, at which point the emulation devices 104 receive the instruction sets and the instruction sets are loaded into the memories of the respective hardware components within the racks housing the emulation logic boards.

Figure 1B:
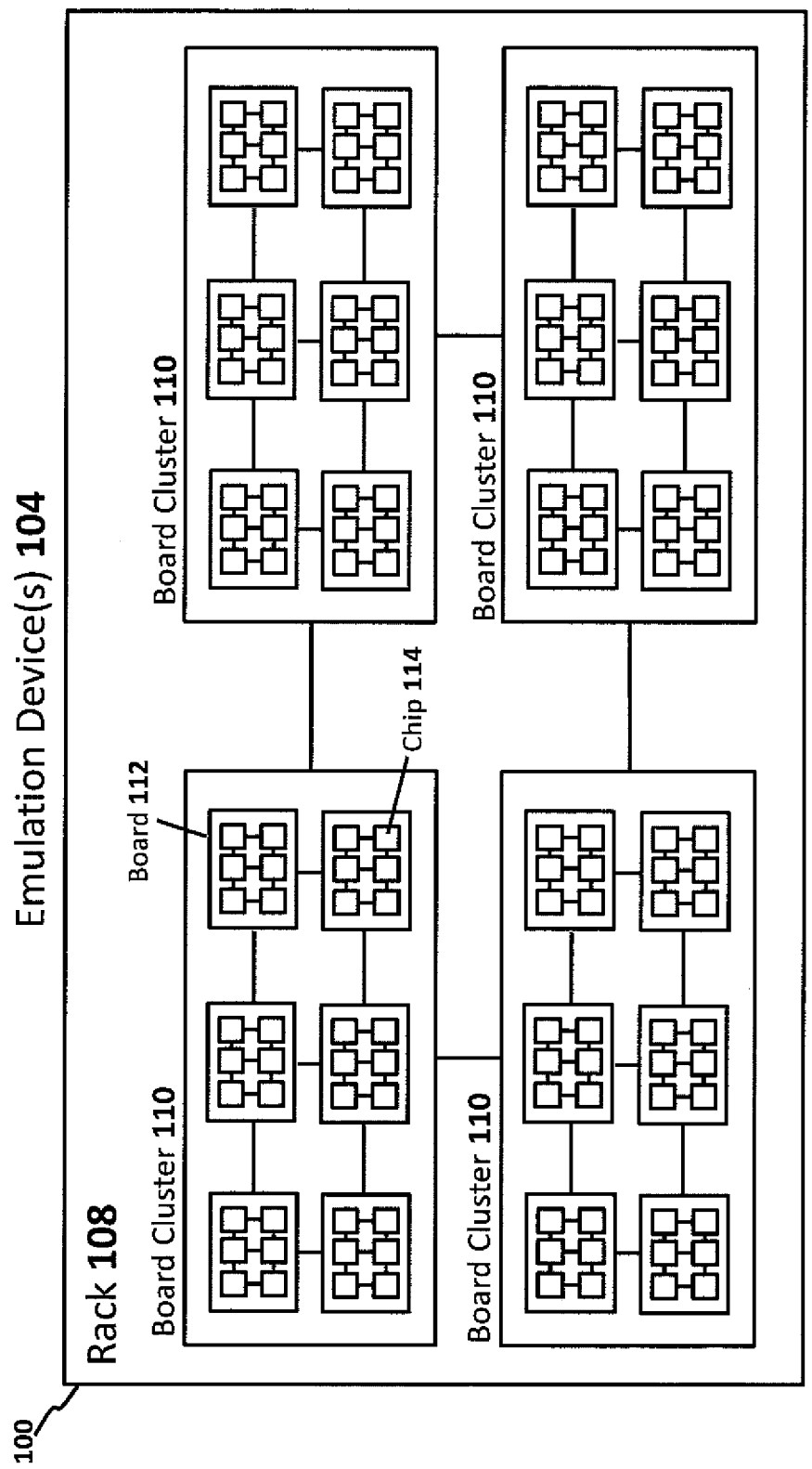
FIG. 1B is a schematic diagram showing components of an emulation device of an emulation system, according to an exemplary embodiment.

FIG. 1B is a schematic diagram showing components of emulation devices 104, according to the exemplary emulation system 100 shown in FIG. 1A. An emulation device 104 of an emulation system 100 may comprise racks 108, board clusters 110, logic boards 112, emulation chips 114, and buses of various types carrying data signals between the various components of the emulation system 100.

A rack 108 may be any physical housing for components of an emulation system 100. In the exemplary system 100, the rack 108 houses a plurality of emulation logic boards 112 that are organized into board clusters 110. In the exemplary emulation system 100, there is only one rack 108, however some other embodiments may comprise a plurality of racks 108. In some cases, the rack 108 may be a computing device, such as a server computer or workstation computer, configured to implement various emulation functions. The rack 108 may physically house components of any type, such as board clusters 110, emulation logic boards 112, emulation chips 114, and buses hosting data signal communications.

The board clusters 110 may be logical and/or physical collectives of one or more logic boards 112. Logic boards 112 may be clustered for any number of reasons, such as creating proximity among a set of boards 112 for more efficient signal transfer and processing between the boards 112 of the board cluster 110. It should be appreciated that clustering logic boards 112 is often a design consideration, and, as such, other embodiments may cluster and/or disaggregate logic boards 112 according to any number of different organizational patterns. As shown in FIG. 1B, the exemplary emulation system 100 comprises four board clusters 110, each of the board clusters 110 comprises six logic boards 112. The board clusters 110 may be interconnected with one another by buses, which may carry data signals transmitted to and from the board clusters 110. Likewise, buses may interconnect the logic boards 112 of a particular board cluster 110, so that the logic boards 112 may transmit and receive data signals to and from other logic boards within the same board cluster 110.

Emulation logic boards 112 comprise computing hardware components capable of emulation functionality to emulate the design and functions of an ASIC or other circuitry; non-limiting examples of emulated logic systems might include application-specific integrated circuits (ASICs), central processing units (CPUs), graphics processing units (GPUs), and arithmetic processing units (ALUs), among others. The logic board 105 may comprise one or more emulation chips 114 performing the functions needed for emulation, and one or more buses interconnecting the emulation chips 114. The buses may be an optical, copper, or any other conductive material capable of carrying data signals. In operation, the buses may carry data signals transmitted to and from the emulation chips 114 of the logic board 112. In some cases, the logic board 112 may comprise one or more buses supporting communication between emulation chips 114 on the same logic board 112 (e.g., intra-board communication); and, in some cases, the logic board 112 may comprise one or more buses supporting communication between emulation chips 114 located on other logic boards 112 of the emulation system 100 (e.g., inter-board communication).

Emulation chips 114 may comprise any number of processors capable of performing the various tasks and processes for emulating an ASIC or other logical processing circuitry, multiplexers configured to direct data signals to and from the processors, buses for communicating data between the processors, and data lanes connecting the components of a processor. An emulator chip 114 may be designed to mimic the functionality of any ASIC or other logic system design, based on programmable logic that configures the emulator chip's 114 behavior to mimic the particular ASIC. In this way, circuitry designers may prototype new ASIC designs using processor-based emulation, before actually manufacturing the ASIC and emulation device 104. The emulation chips 114 may receive a set of instructions to execute from a compiler, which may be a software module component executed by a computing device coupled to the system 100. In operation, the compiler compiles a netlist file representing the ASIC's design. The result of compiling the netlist generates virtual logic comprising instruction sets for the components (e.g., multiplexers, Boolean processors) of the emulator chips 114.

In some embodiments, the processors of the emulator chip 114 may be organized into any number of processor clusters to efficiently share data inputs, data outputs, and data references (e.g., calls to stored data in a data array). For example, multiple processors of an emulator chip 114 may be clustered together such that the processors reference the same data array and/or instruction store. It should be appreciated that, due to the modular nature of the components of the system 100, components such as the processors may be organized into any number of additional or alternative organizational patterns. In some cases, clusters of processors may be clustered into clusters of clusters. However, it should be appreciated that organizational patterns are not required, and thus, in some embodiments, processors of an emulator chip 114 may not be organized into clusters at all.

Figure 2:
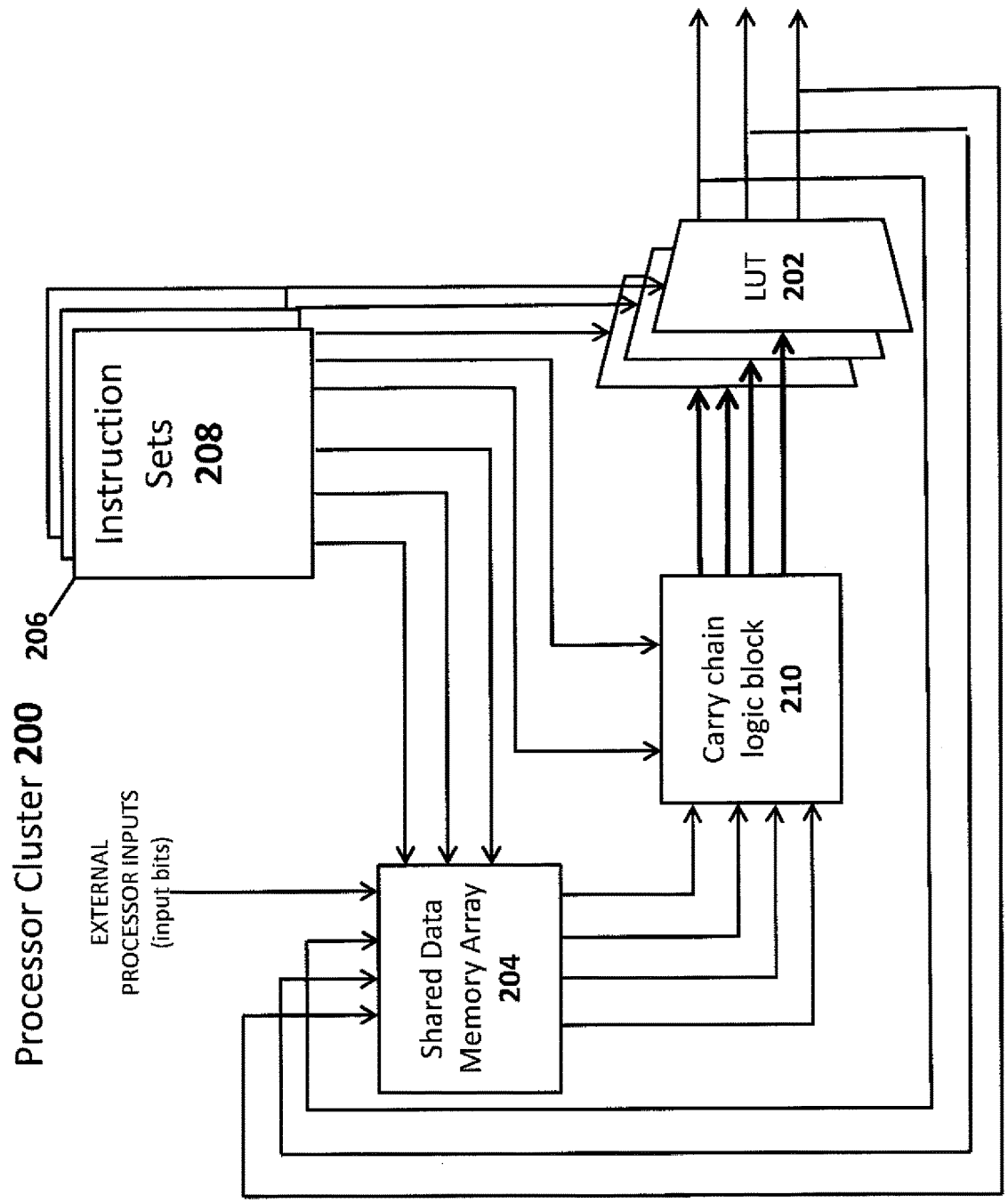
FIG. 2 is a schematic diagram showing components of a processor cluster within an emulation chip, according to an exemplary embodiment.

FIG. 2 shows components of a processor cluster 200 within an emulation chip, according to an exemplary system embodiment. Emulation chips disclosed herein are capable of performing programmatic logic functions used for hardware-based (e.g., processor-based) logic system emulation, which may allow for prototyping ASICs or other logic systems before actual production of the particular ASIC or logic system product. During execution of an emulation test, this programmatic logic may be executed by processors of emulation chips.

In an embodiment, multiple processors may be clustered together into processor clusters containing any number of processors. Clustering may facilitate expansion of the capabilities of an emulation system because the processors may have limitations on the number of logic system gates the processors can emulate. In some cases, processor clusters 200 may be more efficient in prototyping functions of the logic system, such as an ASIC, because of the increased processing power and functionality. For example, a single processor may be able to emulate, at most, 1,280 logic gates (e.g., logical processes), but the ASIC or other logic system currently being tested has several million gates, all of which are to be emulated for proper circuit function and thorough testing. In some embodiments, clusters 200 of processors may be clustered into "clusters of clusters." Clustered processors communicate with each other by sending their LUT evaluations out to other processors in the processor cluster 200.

A processor cluster 200 may include one or more LUT's (multiplexer) 202 that share a common data memory array 204 or other some other resource. In some cases, processor clusters 200 may be capable of performing increasingly more complex logical functions. As such, processor clusters 200 may be capable of prototyping increasingly more complex functions of a logic system (e.g., ASIC, CPU, GPU). As with individual processors, the exemplary processor cluster 200 of an emulation chip comprises any number of multiplexers 202 that perform simple Boolean computations, according to a control logic program or simple set of logical rules, which may be in an instruction memory 206 as instruction sets 208. In the processor cluster 200, however, the multiplexers 202 may share a single data memory array 204, and may also output larger results to the same destination resource. This allows for the processor cluster 200 to emulate more intricate functions of the prototyped logic system, such as an ASIC, because more bits may be processed, stored, or output, thus more complex functions may be modeled. It should be appreciated that processor cluster 200 for a given emulation chip may be formed into any organizational structure, and that nothing described herein should be construed as limiting on the possible organizational structure of the resources. In some cases, for example, clusters may be clustered, thereby forming clusters of clusters.

More specifically, the LUT 202 may be a circuit multiplexer (MUX) configured to represent (e.g., execute or otherwise perform) any Boolean function, thus allowing the emulation of most any function that could be produced by the logic system (e.g., ASIC, CPU, GPU, ALU) currently being emulated. The LUT 202 may comprise one or more circuit crossbars, which may comprise a set of one or more switches. It would be appreciated by one skilled in the art that the switches of the LUT 202 crossbars may be configured as a series of circuitry interconnects, which may be enabled or disabled according to a transistor or other component, such that the switches of the crossbar may select inputted data signals, perform logical functions on the selected data signals, and output data signals, when the transistor enables or disables certain interconnects. An instruction set, stored in an instruction memory 206, may provide instructions to the circuitry of the crossbars of the LUT 202. In many cases, the Boolean functions capable of being executed by the LUT 202 have the same number of inputs (e.g., function parameters) as the number of select inputs leading into the LUT 202. For example, the LUT 202 shown in FIG. 2 may be a so-called "four-way" MUX that has four data inputs but only two select inputs. As such, by varying the values received from the four data inputs, the LUT 202 may allow the processor cluster 200 to emulate any Boolean function that uses two bits. Likewise, the size of the Boolean functions that can be emulated using the LUTs 202 can be increased or decreased by adding or removing the number of select inputs fed into the LUTs 202. For example, in some embodiments, processors 200 of an emulation chip may comprise LUTs 202 with four inputs (e.g., "LUT4"), which allows each of these processor cluster 200 to perform any four-bit Boolean function. However, it should be appreciated that there is no limitation upon the number of select inputs that are associated with the LUTs 202 of an emulation chip.

An emulation chip may further comprise an instruction memory 206, which may be a non-transitory machine-readable storage media configured to store a set of instructions 208 for the processor cluster 200 to use for performing emulation functions. The emulation system may compile machine-readable code containing the functions of the logic system being emulated. The result of compilation is virtual logic containing the programmatic logic representing the functional designs of the emulated ASIC or other logic system. After compilation, the virtual logic is parsed into various instruction sets that may be distributed, or "downloaded," into the various instruction memories 206 of the emulation chips. During compilation, the instruction sets were generated with the expectation that the instruction sets will be provided to specific processors 200 or MUXs. As such, in many cases, the instruction sets are downloaded into predetermined instruction memories 206 according to the input and output destinations of the respective instructions of each instruction set 208. Upon compiling a netlist file representing the design of the logic system (e.g., ASIC, CPU, GPU) being tested, the resulting instruction set may be stored into the instruction memory 206, where each instruction is stored into an individual memory address within the instruction memory 206. An instruction address pointer may identify each respective instruction address on behalf of processor cluster 200, such that components of the processor cluster 200 components may retrieve and execute each individual instruction. In some embodiments, the processor cluster 200 may be configured to sequentially execute each instruction, using an instruction address pointer. In such embodiments, the instruction address pointer may be incremented as each sequential instruction is executed by the components of the processor cluster 200.

The processor cluster 200 may be associated with a data memory 204 comprising non-transitory machine-readable storage media configured to store one or more input and/or output data bits. The data memory 204 may be communicatively coupled to a plurality of processor cluster 200, such that the data memory 204 is accessible by a cluster of processors 200. The data memory 204 may store results of the evaluations (e.g., LUT 202 function output) of the processor cluster 200, or inputs to the processor cluster 200 from external sources (e.g., external processors). As shown in FIG. 2, the data memory 204 may comprise a number of single-bit read (e.g., input) ports, often equal to the number of select inputs of the processor (in this example, there are four). The data memory 204 may also have "write" ports, such as the write port to write the result of a LUT 202 evaluation, or the write port to receive processor inputs from external sources. The data memory 204 may store a number of emulation steps that correspond to a clock-cycle of the ASIC, or other logic system, being emulated. The data stored in the shared data memory array 204 may represent the state of the emulated ASIC or other logic system.

A carry chain logic block 210 is integrally formed in the processor cluster 200. The carry chain logic block 210 comprises a specialized logic designed to perform a certain set of operations such as arithmetic operations that require going through a long chain of logic gates. In order to perform the arithmetic operations, the carry chain logic block 210 may include a collection of gates (such as AND gate, OR gate, XOR gate) grouped together to implement a specific arithmetic operation, such as multi-bit addition operations. Those of skill in the art will understand that the carry chain logic block 210 can be easily extended to apply to subtractors, incrementers, decrementers, counters, and accumulators, in addition to other operations that use carry logic.

The instruction memory 206 may be configured to store instructions for the carry chain logic block 210 for performing the set of operations, such as arithmetic operations, using a long chain of logic gates. Accordingly, the configuration of the carry chain logic block 210 may be dynamically reconfigured via the instructions stored in the instruction memory 206. For example, in one clock cycle, using the instruction set, the carry chain logic block 210 may be configured to perform 10-bit addition. In another clock cycle, using the instruction set, the carry chain logic block 210 may be reconfigured to perform 4-bit subtraction. In other words, the configuration of the carry chain logic block 210 may be controlled via instructions to perform any arithmetic operation in each clock cycle.

In one embodiment, during the application of the addition operation, the carry chain logic block 210 may include XOR gates for generating a sum operation during emulation process of a circuit design. In arithmetic logic, it is recognized that the sum of two single-bit inputs A and B can be expressed by the logical operation:

$$\text{SUM} = A(\text{XOR})B \tag{Eq. 1}$$

The carry chain logic block 210 of the present disclosure builds upon carry lookahead theory in which it is recognized that the carry output bit $C_{out}$ of an arithmetic operation between single-bit inputs A and B and a single-bit carry input $C_{in}$ can be expressed as:

$$C_{out} = (A(\text{AND})B)\text{OR}(C_{in}(\text{AND})(A(\text{XOR})B)) \tag{Eq. 2}$$

From this equation, a single-bit propagate (P) and generate (G) signal are defined as:

$$P = A(\text{XOR})B \tag{Eq. 3}$$

$$G = A(\text{AND})B \tag{Eq. 4}$$

Accordingly, Eq. 1 can be simplified as:

$$C_{out} = G(\text{OR})(C_{in}(\text{AND})P) \tag{Eq. 5}$$

The above carry lookahead equations can be broken down and re-expressed in many useful ways.

In another embodiment, the carry chain logic block 210 may be configured for increment operation. The logic circuit used by the carry chain logic block 210 to perform the increment operation may be the same logic circuit as present in the carry chain adder configured for addition operation described above. In the logic circuit, B is set to 0 and Cin for a first level is set to 1. This adds 1 to the value of A. Alternatively, Cin may be set to 0 for a first level, and B to 1 on a first level and to 0 on all other levels.

In yet another embodiment, the carry chain logic block 210 may be configured for parity operation. The carry chain logic block 210 may include a combination of XOR and XNOR functions for applications such as calculation of parity checking. In arithmetic logic, it is recognized that the parity checking of two single-bit inputs A and B can be expressed by the logical operation:

$$\text{Parity} = A \text{ xor } B \text{ xor } C\text{in}$$

In yet another embodiment, the carry chain logic block 210 may be configured for application of zero detection. The zero detection may be performed by using either a one detect (check if any bit is 1) or an all zero detect (check that all bits are 0). The architectures of the carry chain logic block 210 may also be configured to perform AND, NAND, OR, and NOR functions during emulation process of a design circuit. It is to be noted that the carry chain logic block 210 described herein may be configured to solve for other types of arithmetic operation problem during the emulation of the circuit design.

A plurality of carry chain logic blocks 210 may be cascaded to form a carry chain. For instance, a carry chain may be constructed by cascading N carry chain logic blocks 210 where N is an integer. In one example, N one-bit full adders may be cascaded to perform addition operation, where each full adder produces an output that is consumed by a next full adder, and so on in a chain of full adders (logic blocks).

In an embodiment, a size and a configuration of the carry chain or the carry chain logic block 210 may be selected depending on a number of factors. One of the factors may correspond to the circuit design being emulated. Another factor may correspond to a time period of a clock cycle. In one example, when there is no addition application required during emulation of a first circuit design, the carry chain logic block 210 may not include gates performing addition/sum function. In another example, when there is an addition function and subtraction function required during emulation of a first circuit design, the carry chain logic block 210 may include gates performing addition/subtraction functions.

In order to manage the size and configuration of the carry chain or the carry chain logic block 210, a location where a first bit and a last bit of input data may reside in the carry chain or the carry chain logic block 210 is determined. The location of the first bit and the last bit of the input data in the carry chain or the carry chain logic block 210 may be determined because a frequency in which a processor-based emulation system operates is generally not variable, and each circuit design being emulated in the processor-based emulation system has a specific timing requirement. For this reason, the circuit design being emulated is arranged into a chain of bits where the number of bits are limited based on a timing specification of the circuit design. This implies that the carry chain logic block 210 for implementation of the circuit design is only allowed to propagate based on the timing specification of the circuit design in an emulation system, and once a cycle is completed, the output of the carry chain logic block 210 is registered.

In order to control a first bit of data, a first carry in (Cin) is inhibited so that the first carry in (Cin) cannot come from a previous circuit design in the carry chain logic block 210. This inhibition is performed by placing a multiplexer before the carry in (Cin) of a first carry chain element in the carry chain logic block 210. The multiplexer then selects between a constant or carry in (Cin) from the previous carry chain logic block 210.

In order to control a last bit in the carry chain logic group 210, the carry chain logic group 210 is constructed such that a delay through a critical path is less than a time of a clock cycle of the emulation system. This control is performed by blocking the propagation of the carry output (Cout) bit via a register. The blocking of the carry out bit is done according to the clock cycle timing of the emulation chip.

Figure 3A:
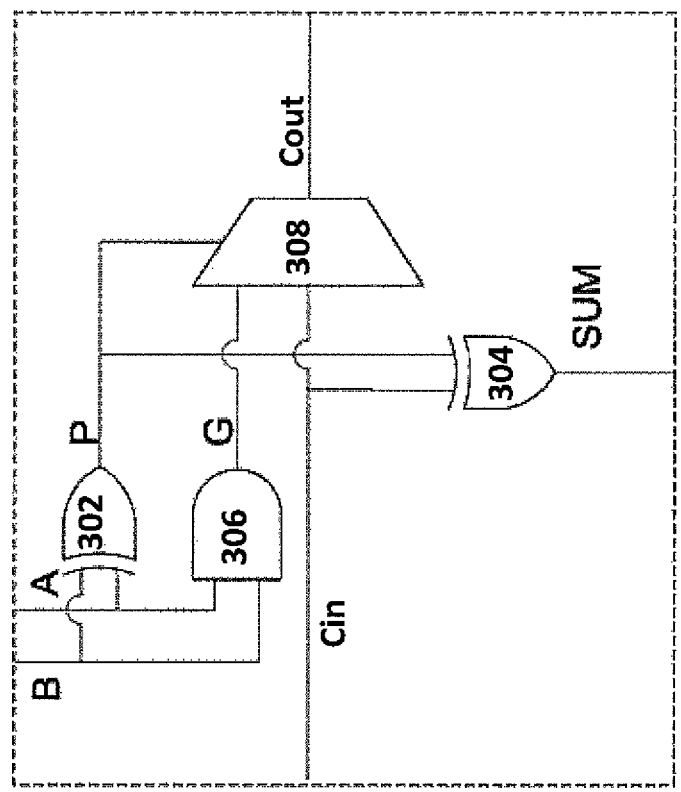
FIG. 3A is a schematic diagram illustrating a carry chain logic block, according to an exemplary embodiment.

FIG. 3A is a schematic diagram illustrating a carry chain logic block 300, according to an exemplary embodiment. In an integrated circuit, addition forms the basis for many logic operations from counting to multiplication. Adder logic is an often used arithmetic logic function in an emulation system. An adder circuit is constructed using a group of logic gates. Adder circuits are used to implement the arithmetic operations (addition and/or subtraction) using two-input operands. Since addition/subtraction is a bit-by-bit operation, a full adder circuit (full adder logic block 300) may include two pieces of logic: "sum logic" to produce a sum result (SUM) on each corresponding operand bit and "carry logic" to generate a carry output (Cout) propagated between each successive operand bit.

In the exemplary FIG. 3A, the full adder logic block 300 has an A input, a B input and an initial carry-in (Cin). A input and B input are coupled to SUM output through an XOR gate 302. Cin is coupled to an SUM output through an XOR gate 304. Furthermore, A input, B input and Cin are coupled to output Cout through AND gates 306, and the carry-in (Cin) to carry-out output (Cout) path goes through a multiplexer 308.

In arithmetic logic, a table for equations representing a one bit full addition operation from the full adder logic block 300 is:

| A | B | Cout | Sum |
|---|---|---|---|
| 0 | 0 | 0 | Cin xor A xor B |
| 0 | 1 | Cin (Propagate) | Cin xor A xor B |
| 1 | 0 | Cin (Propagate) | Cin xor A xor B |
| 1 | 1 | 1 (Generate) | Cin xor A xor B | where A and B are two single-bit inputs, Cin is the carry generated by the previous stage, SUM is the sum output and Cout is the carry generated during the addition operation.

Generate (G)=A and B (new carry out is generated)

Propagate (P)=A xor B (carry in determines value of carry out)

The equation of the sum output (SUM) and carry-out output (Cout) may be expressed mathematically as a function of the two-input operand A, B, and the initial carry input (Cin) as follows:

Cout=G or (P and Cin)

SUM=CM xor A xor B=CM xor P

If G is 1, then Cout=1

If G is 0, then Cout=Cin

In a full adder logic block 300, when the value of A and B is 0, Cout is 0 and SUM is 0. When the value of A is 0 and B is 1, Cout is the value of Cin (carry in), and the Sum is obtained from the XOR of A, B and Cin (carry in). This implies that when Cin (carry in) is 0, the SUM is 1; and when the CM (carry in) is 1, the SUM is 0. As shown in the exemplary FIG. 3A, adding A and B results in a half-adder, and when Cin is added, which is the carry out of the previous operation, the operation is of a full adder logic block 300.

Figure 3B:
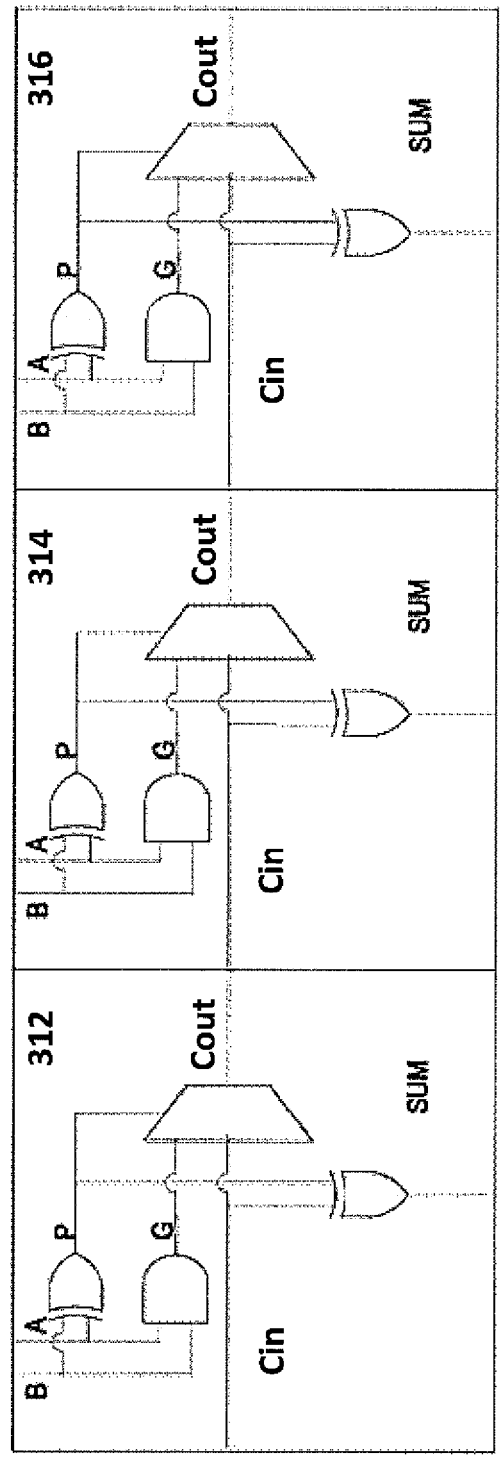
FIG. 3B is a schematic diagram illustrating an N-bit carry chain, according to an exemplary embodiment.

FIG. 3B is a schematic diagram illustrating an N-bit carry chain 310, according to an exemplary embodiment. N-bit carry chain 310 is comprised of N one-bit full adders illustrated, for an example only, as 312, 314 and 316. Each one-bit full adder 312, 314 and 316 has A inputs and B inputs. Each one-bit adder also has a carry-in input (Cin) and a carry-out output, Cout. The inputs are respective nth bit A and B values. The initial carry-in input to the least significant adder stage is normally set to 0 and the carry-out output of each adder stage is connected to the carry-in input of the next most significant adder. The nth-bit SUM forms the SUM result and the carry-out output of the most significant stage adder indicates the final carry-out of the arithmetic operation.

In the case of N-bit carry chain 310, each adder has to wait for the carry-out output signal from the previous least significant adder before the respective adder can perform the calculation on a current stage. Thus, the most significant bit of the SUM and the final carry-out output (Cout) is delayed until the sequential evaluation of the carry-out output (Cout) from the least significant adder stage to the most significant adder stage.

In an embodiment, the carry chain logic blocks of the N-bit carry chain 310 perform both combinatorial and sequential logic functions. The carry chain logic blocks that perform combinatorial logic functions may be programmed to implement a variety of functions including adder logic. As circuit designs become more complicated, this number increases. The size of the N-bit carry chain 310 is, however, dependent on how many operations may be performed in a pre-determined number of clock cycles. In other words, the one-bit full adders are added to form an N-bit carry chain 310 depending on how many bits can be added in pre-determined number of clock cycles. For example, when the pre-determined number of clock cycles is 1 clock cycle, then the one-bit full adders are added to form the N-bit carry chain 310 depending on how many bits can be added in one clock cycle.

The combinatorial logic modules can be programmed to implement one-bit sum logic and the one-bit carry logic (that is, sum logic and carry logic are programmed into one single logic module). This configuration means that whenever an N-bit carry chain 310 is configured in the logic, 2n of the logic modules are used to implement the N-bit carry chain 310, e.g., N combinatorial modules for the sum logic and N combinatorial modules for carry generation.

Figure 4:
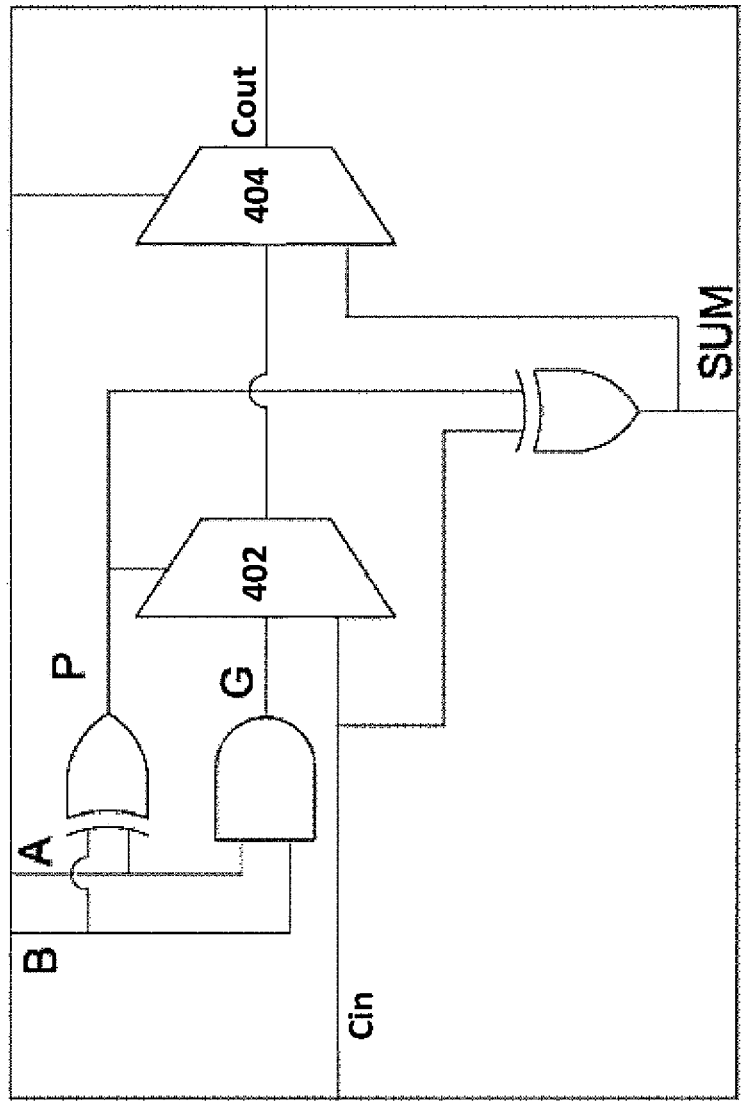
FIG. 4 is a schematic diagram illustrating a carry chain logic block, according to an exemplary embodiment.

FIG. 4 is a schematic diagram illustrating a carry chain logic block 400, according to an exemplary embodiment. The carry chain logic block 400 is configured to perform addition and parity calculation operations. As illustrated in FIG. 4, an initial carry-in input (Cin) to carry-out output (Cout) circuit path goes through two multiplexers 402, 404.

Figure 5:
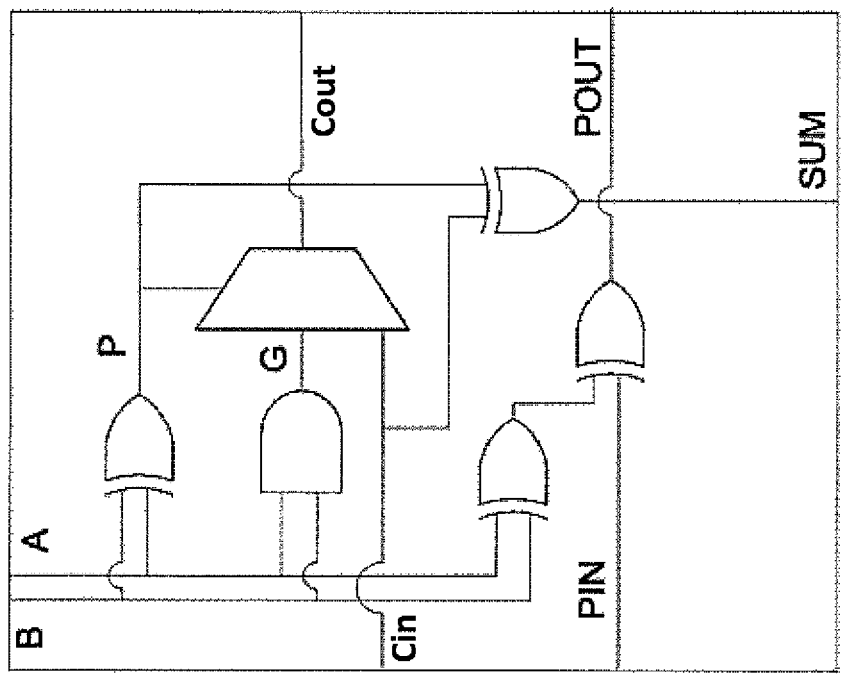
FIG. 5 is a schematic diagram illustrating a carry chain logic block, according to an exemplary embodiment.

FIG. 5 is a schematic diagram illustrating a carry chain logic block 500, according to an exemplary embodiment. The carry chain logic block 500 is configured to perform parity calculation operations. As illustrated in FIG. 5, the carry chain logic block 500 has one Cin to Cout chain and one Pin to Pout chain. The first chain (Cin to Cout) is for addition operation and the second chain (Pin to Pout) is for parity calculation.

Figure 6:
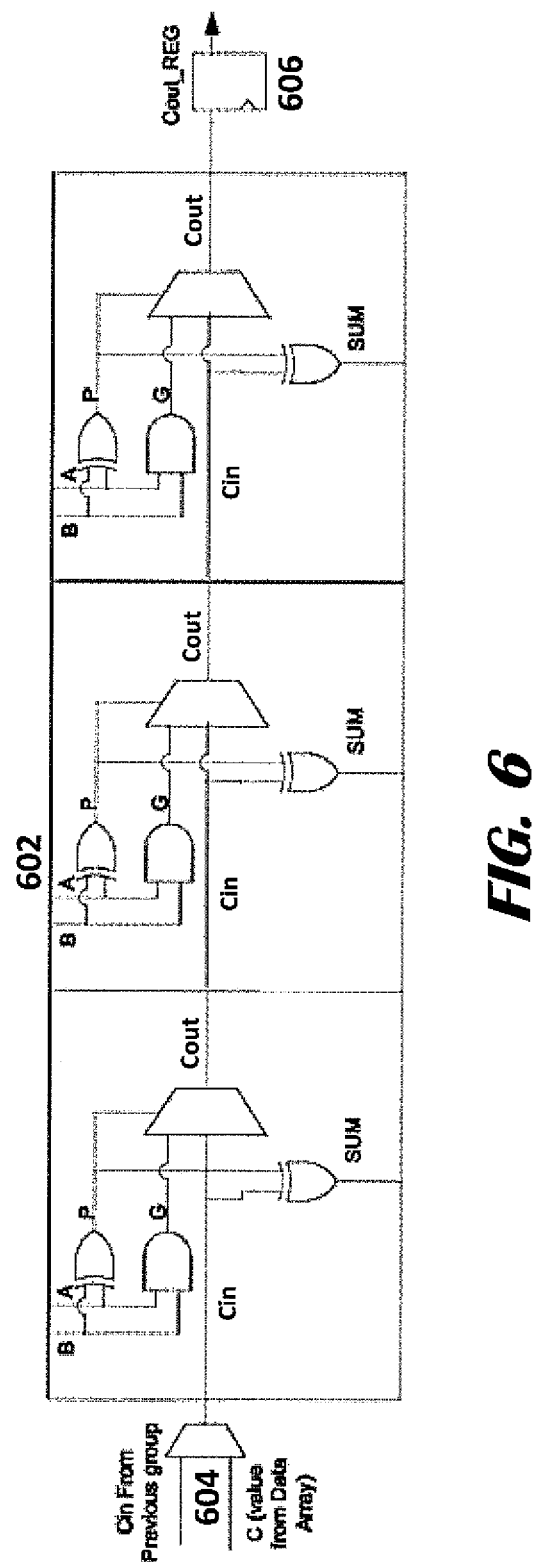
FIG. 6 is a schematic diagram illustrating an N-bit carry chain, according to an exemplary embodiment.

FIG. 6 is a schematic diagram illustrating an N-bit carry chain 602, according to an exemplary embodiment. The N-bit carry chain 602 is provided along with Cin Mux (multiplexer 604) and Cout Register (register 606). A multiplexer 604 is added on one side (the left side) of the N-bit carry chain 602. The multiplexer 604 is provided to decide where to start a new operation in the N-bit carry chain 602. The multiplexer 604 selects between C (a value) from a data array (not shown) or carry in (Cin) from the previous carry chain logic block. If the multiplexer 604 chooses C (a value) from the data array (not shown), then a first carry chain logic block of the N-bit carry chain 602 is a first element (bit 0) of a carry chain computation.

In an embodiment, the multiplexer 604 may be placed between N-bit carry chain 602 at a beginning of a group of 8 carry chain logic blocks. This configuration has an advantage of only adding the multiplexer 604 penalty once every group of 8 carry chain logic blocks.

A register (or a flop) 606 is used to prevent a critical path in the N-bit carry chain 602 from being longer than a clock cycle time in an emulation system. The N-bit carry chain 602 is constructed such that a time of a critical path in the N-bit carry chain 602 is not longer than a time of a clock cycle of the emulation system. This prevention of the critical path in the N-bit carry chain 602 from being longer than the clock cycle time in the emulation system is done by blocking the propagation of the carry out bit via a register 606. The blocking of the carry out bit is done according to the clock cycle timing of the emulation chip. The register 606 is inserted at a point in the N-bit carry chain 602 where the critical path is about 1 clock cycle time of an emulation system.

In an embodiment, the use of the multiplexer 604 at the beginning of the N-bit carry chain 602 and the use of register 606 at the end of the N-bit carry chain 602 is performed to define a length of the chain. The length of the chain may not be decided at the time of constructing a chain, and therefore, the use of the multiplexer 604 and the register 606 to break the chain at desired points enables to achieve the clock cycle time, which is a requirement of an emulation system.

Figure 7:
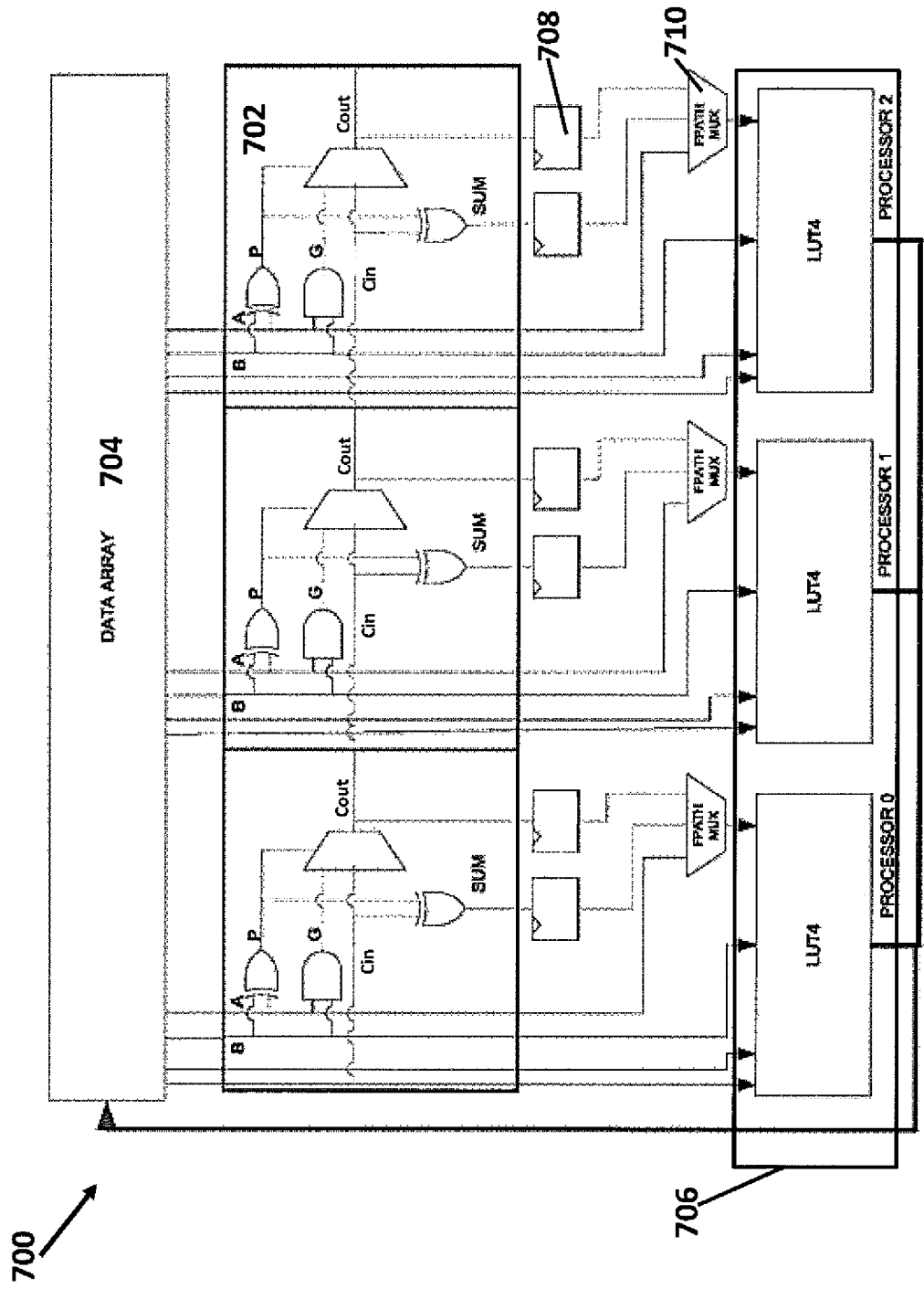
FIG. 7 is a schematic diagram showing components of a processor cluster within an emulation chip having an integrated N-bit carry chain, according to an exemplary embodiment.

FIG. 7 is a schematic diagram showing components of a processor cluster 700 within an emulation chip having a N-bit carry chain 702, according to an exemplary embodiment. FIG. 7 is an example of integration of the carry chain 702 into an infrastructure of the existing processor cluster 700. The carry chain 702 is positioned in between the data array 704 and LUT4 706. The LUT4 706 may select regular data array 704 outputs, or the carry chain 702 outputs such as SUM or Cout.

In operation, processors of the processor cluster 700 may sequentially read instructions from a corresponding instruction memory associated with the processor cluster 700 that stores instructions for the processors of the processor cluster 700 to execute. An instruction may contain bits that may be used by the processors of the processor cluster 700 to determine which bits should be read from a data array 704 or other input source. The bits read from the data array 704 may then be fed to LUT cluster 706, which may be a particular type of multiplexer controlled by the current instruction. One or more inputs in the LUT cluster 706 may also include output results (SUM or Cout) of the carry chain 702. The A and B inputs, and the carry in input Cin is provided at a beginning of the carry chain 702. The A, B, Cin inputs are provided from the data array 704. The carry out (Cout) and sum output from the carry chain 702 is provided to registers/flops 708.

In one embodiment, the registers/flops 708 are provided in the architecture to break a timing path of processing in the carry chain 702. The registers/flops 708 enable to define a length of the chain and thereby achieve a clock cycle time which is a requirement of an emulation system. The processing in the carry chain 702 has to be within a clock cycle because the emulation system comprises of instruction memories reading instructions, and these instruction memories read one instruction per clock cycle. Since the instruction memories read one instruction per clock cycle, this means that, the instruction memory of the emulation system has a timing requirement. Also, the instruction memory can only read for a period of time, and since the emulation clock cycle is tied to the memory clock, if there is a mismatch of timing, the instruction memory will not work and resulting in the whole emulation system to stop working. In another embodiment, the processing in the carry chain 702 may occur in more than one clock cycle without moving out from the scope of the disclosed embodiments. The pre-determined number of clock cycles in which the processing in the carry chain 702 occurs may be selected by a user or an administrator of an emulation system.

The output of the registers/flops 708 is provided to the LUT cluster 706. A multiplexer (FPATH MUX) 710 is provided between the registers/flops 708 and the LUT cluster 706. The multiplexer (FPATH MUX) 710 comprises instructions. The instructions may have a selector for the multiplexer (FPATH MUX) 710 to choose the data array 704 output or the carry chain 702 outputs as an input to the LUT cluster 706. The result of LUT cluster 706 performing its various functions may produce an output bit. In some cases, this output bit may then be transmitted along a LUT output lane to the data array 704 for storage. In these cases, the data array 704 may store any number of output bits resulting from any number of previous LUT 706 evaluations. Additionally or alternatively, the data array 704 may receive over a processor input lane, input bits arriving from a bit source external to the processor cluster 700, including bits transmitted from other processors. In other words, the LUT cluster 706 not only has access to previous results of the processor cluster 700 stored in the data array 704, but the LUT cluster 706 may also access values (e.g., input bits) from outside the processor 700.

Figure 8:
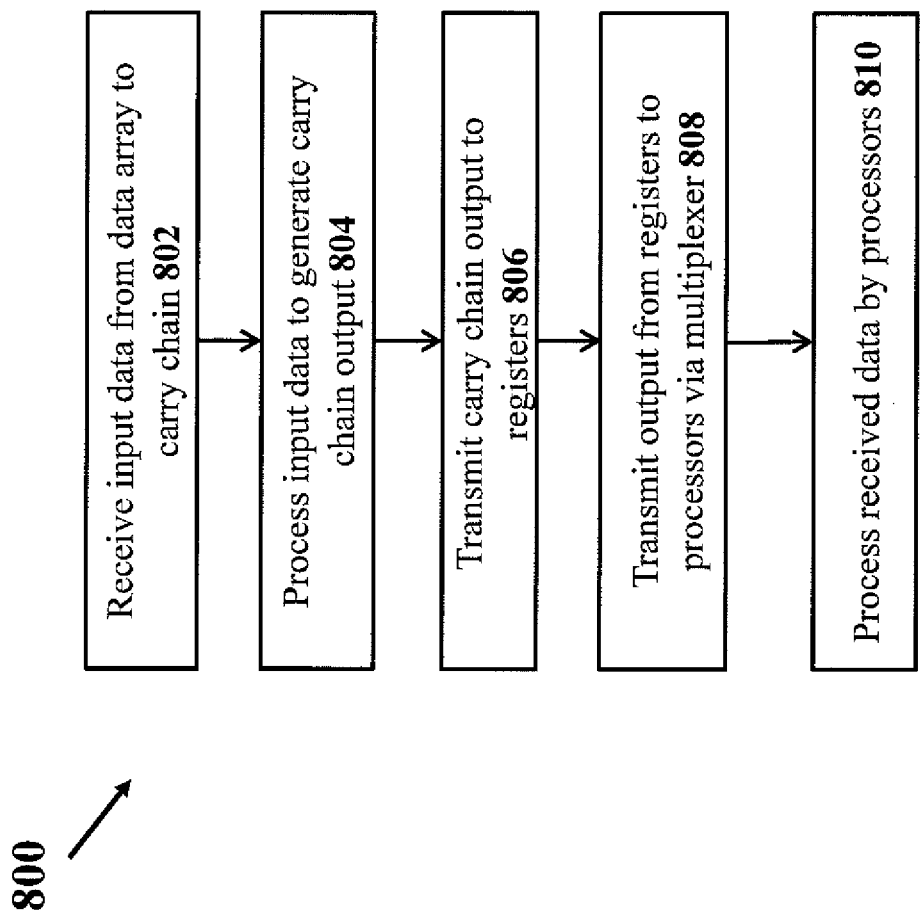
FIG. 8 is a method of operation of a carry chain in an emulation system, according to an exemplary embodiment.

FIG. 8 is a method of operation of a carry chain in an emulation system, according to an exemplary embodiment.

In a first step 802, input data is received from a data memory to a carry chain. A processor of an emulation system is associated with a data memory comprising non-transitory machine-readable storage media configured to store one or more input and/or output data bits. The data memory is communicatively coupled to a plurality of processors such that the data memory is accessible by a cluster of processors. The data memory store results of the processor's evaluations (e.g., LUT function output), or inputs to the processor from external sources (e.g., external processors). The data stored in the data memory is transmitted to the carry chain.

In step 804, input data received by the carry chain may be processed to generate carry chain output. The carry chain is integrally formed in the processor cluster. The carry chain comprises a specialized logic designed to perform a certain set of operations such as arithmetic operations that require going through a long chain of logic gates. In order to perform the arithmetic operations, the carry chain may include a collection of gates (such as AND gate, OR gate, XOR gate) grouped together to implement a specific arithmetic operation, such as multi-bit addition operations.

In step 806, the carry chain output may be transmitted to registers. The registers are provided in the architecture to break a timing path of processing of the data in the carry chain. In an embodiment, the processing in the carry chain may occur within a pre-determined number of clock cycles. In one implementation, the processing in the carry chain may occur within a single clock cycle because the emulation system comprises of instruction memories reading instructions, and these instruction memories read one instruction per clock cycle. Since the instruction memories read one instruction per clock cycle, this means that the instruction memory itself has a timing requirement. Also, the instruction memory can only read for a period of time and since the emulation clock cycle is tied to the memory clock, if there is a mismatch of timing, the memory will not work and, as a result, the whole emulation system will stop working.

The registers are inserted at a point in the carry chain where the critical path is about 1 clock cycle time of an emulation system. When the one clock cycle is reached, the output of the carry chain is stored in the registers. In another implementation, the processing in the carry chain may occur in more than one clock cycle, for example, two clock cycles, without moving out from the scope of disclosed embodiments.

In a next step 808, an output is transmitted from registers to processors via multiplexer. The multiplexer comprises instructions. The instructions may have a selector for the multiplexer to choose the data array output or the carry chain outputs as an input to the LUTs. In a next step 810, processors processed the received data. The result of processor performing its various functions may produce an output bit. In some cases, this output bit may then be transmitted along an output lane to the data array for storage. In these cases, the data array may store any number of output bits resulting from any number of previous processor evaluations.

The foregoing method descriptions and the process flow diagrams are provided merely as illustrative examples and are not intended to require or imply that the steps of the various embodiments must be performed in the order presented. The steps in the foregoing embodiments may be performed in any order. Words such as "then," "next," etc. are not intended to limit the order of the steps; these words are simply used to guide the reader through the description of the methods. Although process flow diagrams may describe the operations as a sequential process, many of the operations can be performed in parallel or concurrently. In addition, the order of the operations may be re-arranged. A process may correspond to a method, a function, a procedure, a subroutine, a subprogram, etc. When a process corresponds to a function, its termination may correspond to a return of the function to the calling function or the main function.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the invention. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module, which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

While various aspects and embodiments have been disclosed, other aspects and embodiments are contemplated. The various aspects and embodiments disclosed are for purposes of illustration and are not intended to be limiting, with the true scope and spirit being indicated by the following claims.

What is claimed is:

1. An apparatus for emulating hardware comprising:
a data array comprising non-transitory, machine-readable storage media configured to store input data for an emulation clock cycle;
a carry chain in communication with the data array to receive one or more inputs from the data array, the carry chain with a selectable configuration to generate output data in response to performing an arithmetic operation by a set of configurable logic gates using the one or more inputs in a pre-determined number of emulation clock cycles, wherein a configuration of the carry chain is selected at compilation of a hardware design being emulated utilizing a blocking register and based on a time period of each emulation clock cycle whereby a carry output data of each configurable logic gate of the carry chain is allowed to propagate to a next configurable logic gate of the carry chain only within each emulation clock cycle and the carry output data is blocked from propagation and registered by the blocking register upon completion of each emulation clock cycle; and
one or more processors in communication with the carry chain and the data array, and configured to emulate a logic gate function using at least the input data from the data array or the output data from the carry chain.

2. The apparatus according to claim 1, wherein the arithmetic operations consist of addition, subtraction, and multiplication.

3. The apparatus according to claim 1, the apparatus further comprising one or more logical boards, each logical board comprising at least one emulation processing circuit.

4. The apparatus according to claim 1, wherein the blocking register is configured to break a timing path of processing in the carry chain.

5. The apparatus according to claim 1, further comprising at least one instruction memory for providing an instruction word to the one or more processors.

6. The apparatus according to claim 1, further comprising a sequencer for providing at least one read address to the data memory array and at least one write address to the data memory array.

7. The apparatus according to claim 1, wherein the data array has one write port.

8. The apparatus according to claim 1, wherein the data array has a plurality of read ports.

9. The apparatus according to claim 1, wherein the carry chain comprises one or more carry chain logic blocks, wherein each of the one or more carry chain logic blocks share a same set of inputs from a set of configurable logic circuits, and wherein the same set of inputs comprises propagate and generate signals.

10. The apparatus according to claim 1, the apparatus further comprises a multiplexer wherein the multiplexer is configured as a partial-crossbar that selectively transmits an output bit produced by the carry chain to the one or more processors.

11. A processor-implemented method for processing of data in an emulation system, the method comprising:
receiving, by a carry chain of the emulation system, one or more inputs from a data array comprising non-transitory machine-readable storage media configured to store input data for an emulation clock cycle;
generating, by the carry chain, output data in response to performing an arithmetic operation by a set of configurable logic gates using the one or more inputs in a pre-determined number of emulation clock cycles, wherein a configuration of the carry chain is selected at compilation of a hardware design being emulated utilizing a blocking register and based on a time period of each emulation clock cycle whereby a carry output data of each configurable logic gate of the carry chain is allowed to propagate to a next configurable logic gate of the carry chain only within each emulation clock cycle and the carry output data is blocked from propagation and registered by the blocking register upon completion of each emulation clock cycle; and
emulating, by one or more processors coupled to the carry chain and the data array, a logic gate function using at least the input data from the data array or the output data from the carry chain.

12. The method according to claim 11, wherein the arithmetic operations consist of addition, subtraction, and multiplication.

13. The method according to claim 11, wherein the emulation system further comprising one or more logical boards, each logical board comprising at least one emulation processing circuit.

14. The method according to claim 11, wherein the blocking register is configured to break a timing path of processing in the carry chain.

15. The method according to claim 11, wherein at least one instruction memory provides an instruction word to the one or more processors.

16. The method according to claim 11, further comprising providing, by a sequencer, at least one read address to the data memory array and at least one write address to the data memory array.

17. The method according to claim 11, wherein the data array has one write port.

18. The method according to claim 11, wherein the data array has a plurality of read ports.

19. The method according to claim 11, wherein the carry chain comprises one or more carry chain logic blocks, wherein each of the one or more carry chain logic blocks share a same set of inputs from a set of configurable logic circuits, and wherein the same set of inputs comprises propagate and generate signals.

20. The method according to claim 11, the apparatus further comprises a multiplexer wherein the multiplexer is configured as a partial-crossbar that selectively transmits an output bit produced by the carry chain to the one or more processors.

* * * * *